United States Patent [19]
Hebeda et al.

[11] 4,132,595
[45] Jan. 2, 1979

[54] DEXTROSE PRODUCTION WITH IMMOBILIZED GLUCOAMYLASE

[75] Inventors: Ronald E. Hebeda; Dennis J. Holik, both of Naperville; Harry W. Leach, Willowbrook, all of Ill.

[73] Assignee: CPC International Inc., Englewood Cliffs, N.J.

[21] Appl. No.: 750,035

[22] Filed: Dec. 13, 1976

[51] Int. Cl.[2] .......... C12D 13/02
[52] U.S. Cl. .......... 195/31 R
[58] Field of Search .......... 195/31 R, 63, 68, 115, 195/13

[56] References Cited

U.S. PATENT DOCUMENTS

| | | | |
|---|---|---|---|
| 3,806,415 | 4/1974 | Hayes | 195/31 R |
| 3,915,797 | 10/1975 | Ishimatsu et al. | 195/29 |
| 4,011,137 | 3/1977 | Thompson et al. | 195/31 R |
| 4,017,363 | 4/1977 | McMullen et al. | 195/31 R |

FOREIGN PATENT DOCUMENTS

| | | | |
|---|---|---|---|
| 2538322 | 3/1976 | Fed. Rep. of Germany | 195/31 R |

OTHER PUBLICATIONS

Weetall et al., "Scale-Up Studies on Immobilized, Purified Glucoamylase, Covalently Coupled to Porous Ceramic Support", *Immobilized Enzyme Technology*, Weetall et al., ed., Plenum Press, N.Y., (1975), pp. 269-297.

Lee et al., "Continuous Production of Glucose from Dextrin by Glucoamylase Immobilized on Porous Silica", *Die Starke*, vol. 27, No. 11, (1975), pp. 384-387.

Lee et al. "Pilot Plant Production of Glucose with Glucoamylase Immobilized to Porous Silica", *Biotech Bioeng.*, vol. 18, (1976), pp. 253-267.

Lee et al., "Continuous Production of Glucose From Dextrin by Glucoamylase Immobilized on Porous Silica", Paper 601, 10th ACS Midwest Meeting, Nov. 7, 1974.

*Primary Examiner*—Thomas G. Wiseman
*Attorney, Agent, or Firm*—David H. LeRoy; John P. Floyd

[57] ABSTRACT

A process for production of dextrose from starch wherein a starch hydrolysate having a high dextrose equivalent produced using soluble glucoamylase is treated solely with an immobilized glucoamylase enzyme to produce a dextrose product.

12 Claims, No Drawings

DEXTROSE PRODUCTION WITH IMMOBILIZED GLUCOAMYLASE

FIELD OF INVENTION

This invention relates to the production of dextrose from starch through the use of an immobilized glucoamylase enzyme.

BACKGROUND OF INVENTION

Processes for conversion of starch to dextrose have long been known in the art. Glucoamylase is an enzyme capable of converting starch to dextrose. The use of glucoamylase for producing dextrose and dextrose-containing syrups is well known in the art. Processes using glucoamylase generally fall into three categories. These are the acid-liquefaction-enzyme conversion process, the enzyme-liquefaction-enzyme conversion process, and the enzyme-solubilization-enzyme conversion process (the granular starch hydrolysis process as disclosed and claimed in U.S. Pat. Nos. 3,922,197; 3,922,198; 3,922,199, and 3,922,200).

In the acid-enzyme process, starch is liquefied and hydrolyzed in an aqueous suspension containing 20 to 40 percent starch and an acid, such as hydrochloric acid. The suspension is then heated to a high temperature, i.e., a temperature between about 70° C. and about 160° C. and at a pH between about 1 to 4.5 to liquefy and partially hydrolyze the starch. The liquefied and partially hydrolyzed starch will generally have a dextrose equivalent (D.E.) value up to about 20 and preferably up to about 15. Typical acid-enzyme processes are disclosed in U.S. Pat. Nos. 2,305,168; 2,531,999; 2,893,921; 3,012,944 and 3,042,584.

In the enzyme-enzyme process, starch is liquefied and partially hydrolyzed in an aqueous suspension containing 20 to 40 percent starch and a liquefying enzyme such as bacterial alpha-amylase enzyme at a temperature of from about 85° C. to about 105° C. The dextrose equivalent value of the liquefied and partially hydrolyzed starch is generally less than about 20 and preferably less than about 15. A process for preparing a low dextrose equivalent partial hydrolysate suitable for converting starch to dextrose and dextrose-containing syrups comprises liquefying starch in water with a bacterial alpha-amylase enzyme preparation to a dextrose equivalent value of from about 2 to about 15, heat treating the slurry containing the liquefied starch to a temperature greater than about 95° C., and thereafter converting the liquefied starch with a bacterial alpha-amylase enzyme preparation to a D.E. of up to about 20. This process is disclosed and claimed in U.S. Pat. No. 3,853,706. In the enzyme-liquefaction-enzyme process, dextrose equivalent values of about 97 are regularly obtained.

In the enzyme-solubilization-enzyme process, a slurry of granular starch is digested by the action of bacterial alpha-amylase (preferably a bacterial alpha-amylase enzyme preparation derived from the microorganism *Bacillus licheniformis*) under conditions such that some granular starch is present during digestion. The digested starch may be thereafter converted to dextrose or dextrose-containing syrups by other enzymes such as glucoamylase.

The low dextrose equivalent liquefied starch hydrolysates prepared by any one of the three processes mentioned above can then be treated with soluble glucoamylase enzyme preparations to convert the low dextrose equivalent starch hydrolysate to dextrose or dextrose containing syrups.

Glucoamylase preparations are produced from certain fungi strains such as those of genus Aspergillus, for example, *Aspergillus phoenicis, Aspergillus niger, Aspergillus awamori,* and certain strains from the Rhizopus species and certain Endomyces species. Glucoamylase effects the hydrolysis of starch proceeding from the non-reducing end of the starch molecule to split off single glucose units at the alpha-1,4 or at the alpha-1,6 branch points. Commercial glucoamylace enzyme preparations comprise several enzymes in addition to the predominating glucoamylase, for example, traces of proteinases, cellulases, alpha-amylases, and transglucosidases.

Alpha-amylase enzyme is produced from many types of microorganism, for example by certain Aspergillus species and *Bacillus subtilis.* Alpha-amylase is an endo enzyme capable of randomly splitting the starch molecule into smaller chain units and is used in the enzyme-enzyme process as liquefying enzyme. Alpha-amylase does not selectively split off dextrose units and breaks only the alpha-1,4 chain link. Debranching enzymes or alpha-1,6-glucosidases have recently been used for their ability to break the alpha-1,6 linkages which cannot be hydrolyzed or broken by the action of alpha-amylase.

Considerable interest has been developed in the use of immobilized enzyme technology to continuously produce dextrose from starch. Various procedures have been described for the immobilization of glucoamylase, alpha-amylase, and amylolytic enzyme combinations.

In the art of enzyme immobilization, glucoamylase immobilization has received considerable attention. Many methods of glucoamylase immobilization are available, for example, in U.S. Pat. Nos. 2,717,852; 3,519,538; 3,619, 371; 3,627,638; 3,672,955; 3,715,277; 2,783,101; and 3,950,222.

Processes using immobilized glucoamylase treatment of starch hydrolysates have recently been reported from Iowa State University. Examples of these processes are the following: Weetall and Suzuki *Immobilized Enzyme Technology: Research and Applications,* Plenun Press, New York, N.Y. (1975) pp. 169–297; Lee et al. *Die Starke* 27 (1975) No. 11 pp. 384–387; Lee et al. *Biotechnology and Bioengineering,* vol. XVII (1976) pp. 253–267; Lee et al. Paper 601, 10th ACS Midwest Meeting, Nov. 7, 1974.

In the Iowa State work, glucoamylase was covalently immobilized on Corning porous silica ceramic carrier. Low dextrose equivalent starch hydrolysates produced by the previously described processes were continuously passed over the immobilized glucoamylase. The maximum dextrose concentration in the product (based on dissolved solids) varied from 87 to 93 percent depending on the dextrose equivalent and the amount of reversion products in the feed. In all examples, yields of dextrose using immobilized glucoamylase were lower than that obtained using soluble glucoamylase on the same substrate.

High dextrose equivalent hydrolysates produced using alpha-amylase resulted in lower dextrose yields than obtained with low dextrose equivalent hydrolysates. For example, in the Die Starke report, when higher dextrose equivalent substrates were substituted for the 24 D.E. material initially employed, dextrose concentration as percent of total dissolved solids decreased from 90.1% to 87.0% for 34 D.E. substrate and 86.6% for 42 D.E. substrate.

German patent application OS 25 38 322 discloses a process for the conversion of starch to dextrose through the use of a combination enzyme system consisting of immobilized glucoamylase and alpha-amylase. The latter enzyme can be soluble alpha-amylase or immobilized alpha-amylase. It is important to note that, during the immobilization of the glucoamylase preparation, the alpha-amylase inherently present therewith becomes essentially inactive. Thus, in order to provide maximum utilization of the immobilized glucoamylase in the conversion of starch to dextrose, it is taught that additional soluble and/or immobilized alpha-amylase must be made available during the conversion in addition to the glycoamylase

SUMMARY OF THE INVENTION

In accordance with this invention a process is provided for the production of dextrose from starch which comprises the steps of:

(a) reacting starch with hydrolytic enzymes or acid to produce a low D.E. starch hydrolysate having a dextrose equivalent from about 2 to about 20;
(b) treating the low D.E. starch hydrolysate with a soluble glucoamylase preparation to produce a starch hydrolysate having a dextrose equivalent less than about 85;
(c) reacting the soluble glucoamylase treated starch hydrolysate with an effective amount of enzyme consisting essentially of glucoamylase in immobilized form; and
(d) recovering a dextrose product.

In another embodiment, the present invention is also directed to a process for producing dextrose from a low D.E. starch hydrolysate having a dextrose equivalent of about 2 to about 20 which comprises the steps of:

(a) treating a starch hydrolysate with a soluble glucoamylase preparation to produce a starch hydrolysate product having a dextrose equivalent less than about 85;
(b) reacting the soluble glucoamylase treated starch hydrolysate product with an effective amount of an enzyme consisting essentially of glycoamylase in immobilized form; and
(c) recovering a dextrose product.

It has unexpectedly been discovered that through practice of this invention, high dextrose yields can be obtained by continuous treatment of high dextrose equivalent (D.E.) starch hydrolysates utilizing an enzyme process differing from the prior art processes in that the process of this invention consists essentially of an immobilized glucoamylase (devoid of free or immobilized active alpha-amylase). In contrast to previous methods, dextrose contents found using an immobilized glucoamylase closely parallel those obtained using soluble glucoamylase. Furthermore, dextrose content was essentially constant throughout the range of about 30 D.E. to about 85 D.E. In addition, improved enzyme utilization was obtained as shall be demonstrated more fully hereinafter. The combination of high dextrose yield and improved enzyme utilization in a continuous process using an immobilized glucoamylase as the sole enzyme is a commercially significant development for conversion of starch to dextrose.

DESCRIPTION OF PREFERRED EMBODIMENTS

The present invention can utilize starch or a low dextrose equivalent starch hydrolysate of about 2 to about 20 D.E. as starting material. A significant distinction over prior art processes is that the starch or low dextrose equivalent starch hydrolysate must be treated with a soluble glucoamylase preparation to produce a high dextrose equivalent starch hydrolysate prior to reaction with the immobilized glucoamylase. The high dextrose equivalent hydrolysate has a dextrose equivalent in the range of about 30 to about 85 D.E. and most preferably has a dextrose equivalent in the range of about 45 to about 85 D.E.

The low dextrose equivalent starch hydrolysate can be produced as previously described, for example, the acid-liquefaction-enzyme process, the enzyme-liquefaction-enzyme conversion process, or the enzyme-solubilization-enzyme conversion process. If a low dextrose equivalent starch hydrolysate is the starting material, the dextrose equivalent must be increased to the desired high dextrose equivalent level through treatment with a soluble glucoamylase preparation either along or in combination with other hydrolytic enzymes such as alpha-1,6-glucosidases.

According to this invention, the high dextrose equivalent starch hydrolysate of less than about 85 D.E. is treated solely with an immobilized glucoamylase preparation (i.e. devoid of free or immobilized active alpha-amylase) to produce the dextrose. The immobilized glucoamylase preparation is used alone without the addition or combination of other soluble or immobilized alpha-amylase enzymes, and no further steps or enzymatic treatment are required to produce the dextrose level desired in the product. Dextrose products containing about 95 percent dextrose were produced in column operation using immobilized glucoamylase preparations at 25 percent solids and 45° C. when the starch hydrolysate feed was greater than 30D.E. Dilution of the starch hydrolysate feed to 10 percent solids gave an effluent containing about 97 percent dextrose.

Immobilized glucoamylase preparations are well known and can be produced, for example, by any of the methods previously discussed, during which the alpha-amylase portion of the glucoamylase becomes inactivated and can therefore be present as the inactive form of alpha-amylase. It is preferred to use the immobilized glucoamylase preparation produced according to U.S. Pat. No. 3,783,101 in which the glucoamylase preparation is covalently coupled to silica.

Glucoamylase activity units are determined as follows: The substrate is a 10–20 D.E. alpha-amylase thinned hydrolysate of waxy maize starch dissolved in water and diluted to 4.0 grams of dry substance per 100 ml. of solution. Exactly 50 ml. of the solution is pipetted into a 100 ml. volumetric flask. To the flask is added 5.0 ml. of 1.0 molar sodium acetate-acetate acid buffer (pH: 4.3). The flask is placed in a water bath at 60° C. and after 10 minutes the proper amount of enzyme preparation is added. At exactly 120 minutes after addition of the enzyme preparation the solution is adjusted to a phenolphthalein end-point with 0.5 normal sodium hydroxide. The strength of the sodium hydroxide solution must be adjusted so that the total volume after neutralization is less than 100 ml. The solution is then cooled to room temperature, and diluted to volume. A reducing sugar value, calculated as dextrose, is determined on the diluted sample and on a control with no enzyme preparation added. Glucoamylase activity is calculated as follows:

$$A = (S - B)/(2\ 33\ E)$$

where

A = glucoamylase activity units per ml. (or per gram) of enzyme preparation.

S = 0 reducing sugars in enzyme converted sample, grams per 100 ml.

B = reducing sugars in control, grams per 100 ml.

E = amount of enzyme preparation used, ml. (or grams). S should not exceed 1.0 grams per 100 ml.

The term dextrose equivalent or "D.E." value used herein refers to the reducing sugars content of the dissolved solids in a starch hydrolysate expressed as percent dextrose as measured by the Schoorl method (*Encyclopedia of Industrial Chemical Analysis,* Vol. II, pp. 41–42).

Dextrose was determined by the procedure of Scobell, Tai and Hill as reported in *Advances in Automated Analysis, Technicon International Congress,* Vol. II, p. 70 (1969). In this colorimetric procedure, dextrose is oxidized by glucose oxidase to gluconic acid and hydrogen peroxide. In the presence of peroxidase, the hydrogen peroxide reacts with potassium ferrocyanide to give the yellow ferricyanide with a color intensity proportional to the original dextrose concentration.

The following examples demonstrate the conversion of a high D.E. starch hydrolysate to high dextrose containing products with immobilized glucoamylase.

EXAMPLE I

A starch hydrolysate having a dextrose equivalent level of 11 D.E. was incubated at 60° C. and pH 4.3 at 30 percent solids by dry weight basis for 16 hours using a soluble glucoamylase preparation at 14 units per 100 g. dry weight basis to produce an 84 D.E. hydrolysate product.

Immobilized glucoamylase was prepared by binding glucoamylase to silanized porous silica at pH 7.0 with glutaraldehyde according to the procedure presented in U.S. Pat. No. 3,783,101.

After incubation, the 84 D.E. hydrolysate was heated to inactivate any soluble enzymes and adjusted to a feed liquor solids level of 25 percent and fed through a column (inside diameter 30mm, length 190mm) containing a 100 ml. bed of immobilized glucoamylase on porous silica (55 g. dry weight basis or 14 units of glucoamylase per g. dry weight basis) at a rate of 2.0 bed volumes per hour.

A dextrose level of 95.8 percent dry weight basis was initially obtained. Increasing the flow rate to 5.1 bed volumes per hour and reducing the solids level to 10 percent resulted in a dextrose level of 97.2 percent dry basis weight.

EXAMPLE II

A low dextrose equivalent starch hydrolysate of 11 D.E. was treated with soluble glucoamylase at 60° C. and pH 4.3 for exactly 16 hours at 25 percent solids by dry weight basis. Glucoamylase dosage and the dextrose equivalent attained are shown below:

| Glucoamylase Dosage Units/100g Dry Substance | Dextrose Equivalent Attained |
|---|---|
| 1.4 | 30 |
| 3.1 | 47 |
| 6.4 | 65 |
| 13.4 | 80 |

The reaction was stopped by heating at 95° C. for 15 minutes. Each substrate was readjusted to 25 percent solids by dry weight basis. Saccharide distribution for each hydrolysate feed is as follows:

| | Feed Composition % d.b. by Paper Chromatography | | | | | |
|---|---|---|---|---|---|---|
| Feed D.E. | Dextrose[a)] | Maltose | Isomaltose | Maltulose | DP-3 | DP-4+[b)] |
| 11 | 0.8 | — | 3.2[c)] | — | 4.7 | 91.3 |
| 30 | 26.0 | 5.6 | 0.1 | 0 | 7.9 | 60.4 |
| 47 | 44.0 | 8.6 | 0 | 0.1 | 6.3 | 41.0 |
| 65 | 59.9 | 10.6 | 0 | 0.6 | 0.7 | 28.2 |
| 80 | 76.6 | 3.9 | 0.5 | 0.6 | 0.7 | 17.7 |

a)Dextrose by difference (i.e. 100% - Sum of percent non-dextrose)
b)Degree of Polymerization of "4" and greater as total percent
c)Total Degree Polymerization of "2" components A column containing a 100 ml. bed of glucoamylase preparation immobilized on porous silica was operated at 1 bed volume per hour at 45° C. and pH 4.3 using the prepared feeds at 25% solids and also the 11 D.E. starch hydrolysate. The procedure used for binding glucoamylase was essentially the same as that presented in U.S. Pat. No. 3,783,101. Composition of the dextrose containing product obtained at the various D.E. levels is as follows:

| | | Product Composition % d.b. by Paper Chromatography[a)] | | | | |
|---|---|---|---|---|---|---|
| Feed D.E. | Dextrose[b)] | Maltose | Isomaltose | Maltulose | DP-3 | DP-4+[c)] |
| 11 | 93.7 | 0.8 | 2.4 | 0.9 | 0.3 | 1.9 |
| 30 | 94.1 | 1.0 | 2.3 | 0.9 | 0.3 | 1.4 |
| 47 | 94.2 | 0.8 | 2.6 | 0.9 | 0.4 | 1.1 |
| 65 | 94.7 | 0.7 | 2.6 | 0.8 | 0.4 | 0.8 |
| 80 | 94.6 | 0.8 | 2.8 | 0.8 | 0.5 | 0.5 |

a)Normalized
b)Glucose Oxidase Method
c)Degree of Polymerization of "4" and Greater as total percent

EXAMPLE III

Example II was repeated with the exception that the column of immobilized glucoamylase was operated at 1.5 bed volume per hour. Composition of the dextrose containing product obtained at the various D.E. levels is as follows:

| | | % d.b. by Paper Chromatography[a)] | | | | |
|---|---|---|---|---|---|---|
| Feed D.E. | Dextrose[b)] | Maltose | Isomaltose | Maltulose | DP-3 | DP-4+[c)] |
| 11 | 92.6 | 0.9 | 1.8 | 0.9 | 0.4 | 3.4 |
| 30 | 93.2 | 0.9 | 1.5 | 0.7 | 0.3 | 3.4 |
| 47 | 93.6 | 0.9 | 1.7 | 0.9 | 0.3 | 2.6 |
| 65 | 93.5 | 0.8 | 2.2 | 1.0 | 0.5 | 2.0 |
| 80 | 94.6 | 0.8 | 2.2 | 0.8 | 1.2 | |

a)Normalized
b)Glucose Oxidase Method
c)Degree of Polymerization of "4" or Greater as total percent

EXAMPLE IV

Example II was repeated with the exception that the column of immobilized glucoamylase was operated at 0.7 bed volume per hour. Composition of the dextrose containing product obtained at various D.E. levels is as follows:

| | | % d.b. by Paper Chromatography[a)] | | | | |
|---|---|---|---|---|---|---|
| Feed D.E. | Dextrose[b)] | Maltose | Isomaltose | Maltulose | DP-3 | DP-4+[c)] |
| 11[d)] | 93.2 | 0.7 | 4.4 | 0.8 | 0.6 | 0.3 |
| 30 | 94.4 | 0.8 | 3.0 | 0.8 | 0.4 | 0.6 |

-continued

| | | % d.b. by Paper Chromatography[a] | | | | |
|---|---|---|---|---|---|---|
| Feed D.E. | Dextrose[b] | Mal-tose | Isomal-tose | Maltulose | DP-3 | DP-4+[c] |
| 47 | 94.3 | 0.7 | 3.3 | 0.8 | 0.4 | 0.5 |
| 65 | 94.1 | 0.9 | 3.5 | 0.8 | 0.4 | 0.3 |
| 80 | 93.6 | 0.7 | 4.1 | 0.9 | 0.5 | 0.2 |

[a]Normalized
[b]Glucose Oxidase Method
[c]Degree of Polymerization of "4" of Greater as total percent
[d]This sample (only) run at 0.5 bed volume per hour.

EXAMPLE V

This example shows the effect of flow rate expressed as bed volume per hour (BVH) on the product from the immobilized glucoamylase column using the 80 D.E. hydrolysate prepared as in Example II and further diluted with water to 10% solids (dry weight basis). The column containing a 100 ml. bed of glucoamylase preparation immobilized on porous silica was operated at 45° C. and pH 4.3. Composition of the dextrose containing product is as follows:

| | | % d.b. by Paper Chromatography[a] | | | | |
|---|---|---|---|---|---|---|
| Flow Rate BVH | Dextrose[b] | Mal-tose | Isomal-tose | Maltu-lose | DP-3 | DP-4+[c] |
| 2.0 | 94.9 | 0.6 | 2.7 | 1.2 | 0.3 | 0.3 |
| 2.4 | 95.4 | 0.6 | 2.3 | 1.1 | 0.3 | 0.3 |
| 3.0 | 95.1 | 0.6 | 2.2 | 1.2 | 0.3 | 0.6 |
| 4.0 | 95.7 | 0.5 | 1.5 | 1.0 | 0.3 | 1.0 |

[a]Normalized
[b]Glucose Oxidase Method
[c]Degree of Polymerization of "4" or Greater as total percent

EXAMPLE VI

This example demonstrates the effect of solids (dry weight basis) on the conversion of a high dextrose equivalent starch hydrolysate to a high dextrose product with an immobilized glucoamylase.

An 11 D.E. starch hydrolysate was converted to an 80 D.E. starch hydrolysate as shown in Example II. The 80 D.E. starch hydrolysate was diluted to different solids levels by dry weight basis and treated with immobilized glucoamylase as shown in Example II. The results for the 80 D.E. starch hydrolysate are as follows:

| | | | % d.b. by Paper Chromatography[a] | | | | |
|---|---|---|---|---|---|---|---|
| Solids % w/w | Flow Rate BVH | Dex-trose[b] | Mal-tose | Isomal-tose | Maltu-lose | DP-DP-3 | 4+[c] |
| 25 | 1.0 | 94.6 | 0.8 | 2.8 | 0.8 | 0.5 | 0.5 |
| 10 | 4.0 | 95.7 | 0.5 | 1.5 | 1.0 | 0.3 | 1.0 |
| 5 | 5.5 | 97.1 | 0.2 | 1.1 | 0.9 | 0.1 | 0.6 |

[a]Normalized
[b]Glucose Oxidase Method
[c]Degree of Polymerization of "4" and Greater as total percent As seen from the above data, dextrose yields using immobilized glucoamylase according to this invention are essentially constant throughout the entire range of about 30 D.E. to about 85 D.E. In contrast with the prior art, the above data also show high dextrose levels of at least 93 percent produced from high dextrose equivalent starch hydrolysates using solely an immobilized glucoamylase.

Although the foregoing examples demonstrate a preferred immobilized glucoamylase, it is to be understood that other types of immobilized glucoamylases can be employed, so long as the alpha-amylase portion is in the inactive form and the high D.E. hydrolysate feed was produced using soluble glucoamylase.

We claim:

1. A process for the production of dextrose from starch which comprises the steps of:
   (a) reacting starch with hydrolytic enzymes or acid to produce a low D.E. starch hydrolysate having a dextrose equivalent from about 2 to about 20;
   (b) treating the low D.E. starch hydrolysate with a soluble glucoamylase preparation to produce a starch hydrolysate having a dextrose equivalent from about 30 to about 85;
   (c) reacting the soluble glucoamylase-treated starch hydrolysate with an effective amount of an enzyme consisting of immobilized glucoamylase under conditions to produce a dextrose product having a dextrose content of at least about 93 percent dry weight basis; and
   (d) recovering said dextrose product.

2. The process of claim 1, wherein the soluble glucoamylase treated starch hydrolysate has a dextrose equivalent from about 45 to about 85.

3. The process of claim 1, wherein the immobilized glucoamylase is covalently bound to porous silica.

4. The process of claim 1, wherein the dextrose product has a dextrose content of at least 95 percent dry weight basis.

5. A process for producing dextrose from a low D.E. starch hydrolysate having a dextrose equivalence of about 2 to about 20 which comprises the steps of:
   (a) treating said starch hydrolysate with a soluble glucoamylase preparation to produce a starch hydrolysate product having a dextrose equivalent from about 30 to about 85;
   (b) reacting the soluble glucoamylase treated starch hydrolysate product with an effective amount of an enzyme consisting of immobilized glucoamylase under conditions to produce a dextrose product having a dextrose content of at least about 93 percent dry weight basis; and
   (c) recovering said dextrose product.

6. The process of claim 5, wherein the soluble glucoamylase treated starch hydrolysate product has a dextrose equivalent from about 45 to about 85.

7. The process of claim 5, wherein the immobilized glucoamylase is covalently bound to porous silica.

8. The process of claim 5, wherein the dextrose product has a dextrose content of at least 95 percent dry weight basis.

9. A process for the production of dextrose product having a dextrose content of at least about 93 percent dry basis weight comprising reacting a starch hydrolysate having a D.E. of about 30 to about 85, said hydrolysate being free of active alpha-amylase enzyme, with an effective amount of an enzyme consisting of immobilized glucoamylase to produce said dextrose product.

10. The process of claim 9, wherein the starch hydrolysate has a dextrose equivalent from about 45 to about 85.

11. The process of claim 9, wherein the immobilized glucoamylase is covalently bound to porous silica.

12. The process of claim 9, wherein the dextrose product has a dextrose content of at least 95 percent dry weight basis.

* * * * *

UNITED STATES PATENT AND TRADEMARK OFFICE
CERTIFICATE OF CORRECTION

PATENT NO. : 4,132,595

DATED : Jan. 2, 1979

INVENTOR(S) : Ronald E. Hebeda et al

It is certified that error appears in the above-identified patent and that said Letters Patent are hereby corrected as shown below:

Column 2 line 11, delete "glucoamylace" and insert --glucoamylase-- therefor.
Column 2 line 37, delete "2,783,101" and insert --3,783,101-- therefor.
Column 3 line 14, delete "glycoamylase" and insert --glucoamylase-- therefor.
Column 3 line 42, delete "glycoamylase" and insert --glucoamylase-- therefor.
Column 4 line 19, delete "along" and insert --alone-- therefor.
Column 4 line 53, delete "acetate-acetate" and insert --acetate-acetic-- therefor.
Column 4 line 68 in the formula, delete "(2 33 E)" and insert --(2 x E)-- therefor.
Column 5 line 5 before "reducing sugars", delete "0".
Column 6 about line 50 in the last line of the TABLE in the column headed DP-3, delete "1.2" and insert --0.4-- therefor.

UNITED STATES PATENT AND TRADEMARK OFFICE
CERTIFICATE OF CORRECTION

PATENT NO. : 4,132,595

DATED : Jan. 2, 1979

INVENTOR(S) : Ronald E. Hebeda et al

It is certified that error appears in the above-identified patent and that said Letters Patent are hereby corrected as shown below:

Column 6 about line 50 in the last line of the TABLE in the space under 2.0 of the last column, insert --1.2--.

Column 6 line 65, underline "%d.b. by Paper Chromatography" to be over the "Maltose" thru "DP-4+" column of the Table.

Column 6 line about 67 in the TABLE, delete the capital footnote "C)" and insert the small footnote --c)--.

Column 7 line about 3, underline "% d.b. by Paper Chromatography" to be over the "Maltose" thru "DP-4+" column of the Table.

Column 7 line about 4, delete the capital footnote "C)" and insert the small footnote --c)--.

Column 7 line about 50, delete the superfluous "DP-" above the "DP-3" column, delete "$4^{+C)}$" in the final column and insert--$DP-4^{+c)}$ --.

In claim 5 column 8 line 34, delete "equivalence" and insert --equivalent-- therefor.

Signed and Sealed this

*Sixth* Day of *November 1979*

[SEAL]

*Attest:*

LUTRELLE F. PARKER

RUTH C. MASON
*Attesting Officer*

*Acting Commissioner of Patents and Trademarks*